Nov. 21, 1939. H. L. HANSON ET AL 2,180,466
TUBE THREADING IMPLEMENT
Filed Feb. 28, 1939
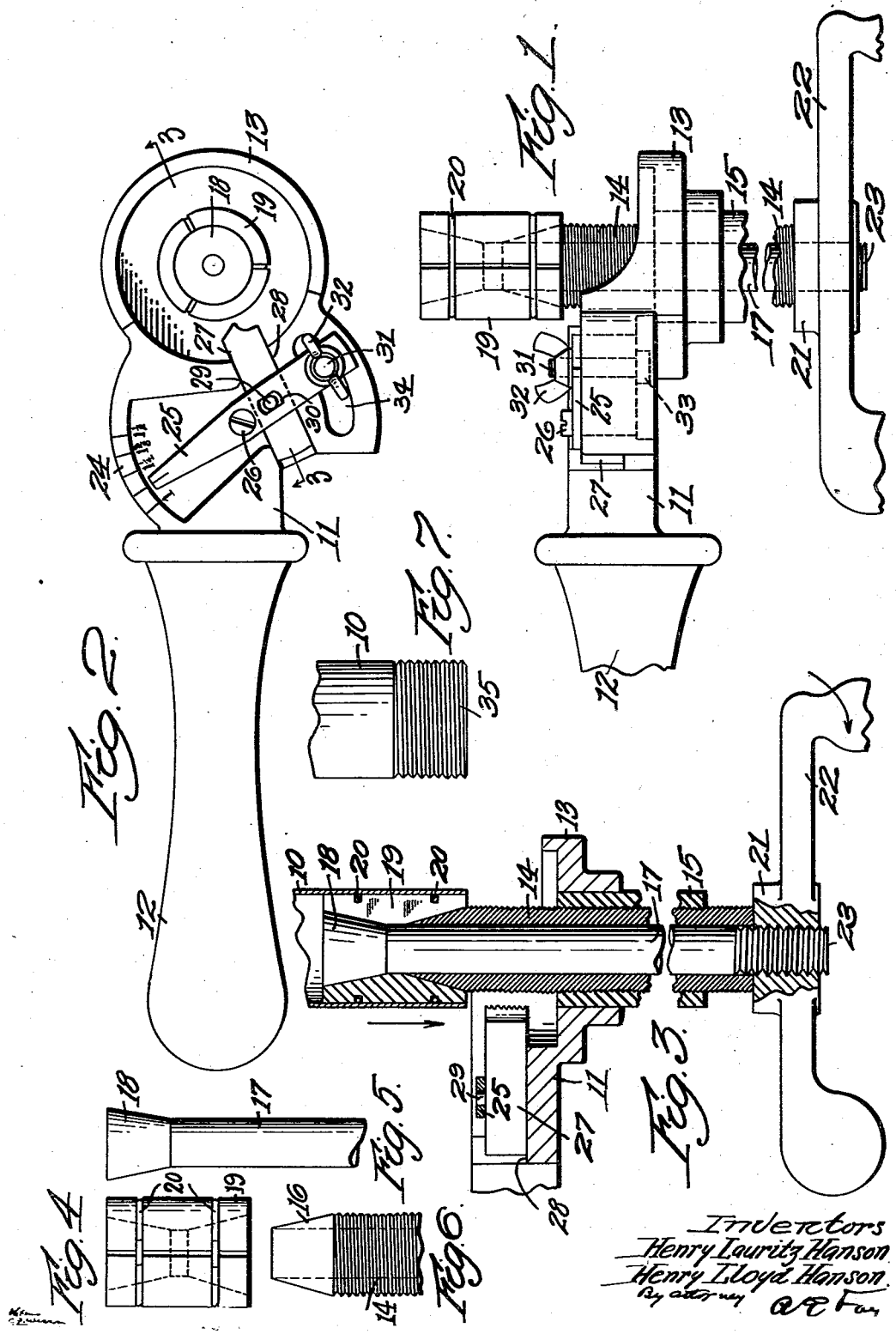
Inventors
Henry Lauritz Hanson
Henry Lloyd Hanson Patented Nov. 21, 1939

2,180,466

UNITED STATES PATENT OFFICE 2,180,466

TUBE THREADING IMPLEMENT

Henry Lauritz Hanson and Henry Lloyd Hanson, Worcester, Mass.; Thekla C. Hanson executrix of Henry Lauritz Hanson, deceased Application February 28, 1939, Serial No. 259,002

4 Claims. (Cl. 10—101)

This invention relates to a hand supported and hand manipulated implement for the purpose of threading tubes.

The principal objects of the invention are to provide a very simple device for threading thin tubes consisting of very few parts and avoiding complications; to provide a construction of this kind, in which tubes of different sizes can be threaded, with a gauge directly connected with the cutting tool and operating exactly with the cutting tool for placing the cutting tool in the right position for threading tubes of various sizes, and to provide an improved internal clutch for receiving and holding the tube to be threaded.

Other objects and advantages of the invention will appear hereinafter.

Reference is to be had to the accompanying drawing, in which

Fig. 1 is a side view of a preferred embodiment of this invention;

Fig. 2 is a plan;

Fig. 3 is a diametrical sectional view on the line 3—3 of Fig. 2;

Fig. 4 is an elevation of the internal clutch;

Fig. 5 is an elevation of the top of the central holding screw;

Fig. 6 is an elevation of the top of the lead screw, and

Fig. 7 is a side view of the work in the form of a tube threaded on the exterior by this device.

The invention is designed to provide a thread on the lower end of a piece of thin tubing 10. It comprises a frame 11 which has a handle 12 by which the frame is adapted to be supported in one hand of the operator. This frame 11 is provided at its extreme end with a circular boss 13 having a vertical perforation therethrough, screw-threaded and receiving in said screw-thread a hollow lead screw 14. This lead screw extends down through a cylindrical nut 15 and at the top is provided with a conical end 16. It is threaded throughout its length. Inside the lead screw is a clamping screw 17 having an opposite conical top 18. These two cones furnish a spool-shaped mounting for a work chuck 19 composed of a plurality of segments separated from each other and connected together by springs 20.

The left handed screw 17, by means of a nut 21 having an operating handle 22, is pulled down, pushing up the lead screw 14 and pulling down the head 18 to bind this chuck. This expands the chuck on the inside of the work 10 and holds the work in position. In this way the work is held in position on the rotating lead screw 14. The screw-thread 23 at the bottom of the screw 17 is left handed and the handle is screwed up until it engages the bottom of the lead screw. The screw-thread on the lead screw is right handed and the rotation of the work is provided for by the rotation of the handle 22 in the left hand direction.

On the frame 11 is provided a scale 24 with a pointer 25 pivoted on a screw 26. This scale is for the purpose of setting a threading cutting tool 27 so that it will cut the thread properly for tubes of different sizes as indicated by the scale. This tool slides radially in ways 28 on the frame 11 and is provided with a pin 29 passing through a lateral slot 30 in the lever 25, which is a comparatively strong lever and not merely a pointer. This lever is operated by hand by a screw 31 and a thumb nut 32 in the screw. The screw is provided with a head 33 on the bottom and the frame 11 is provided with an arcuate slot 34 in which this screw 31 can be moved back and forth when the thumb nut is loosened.

Thus, it will be seen that the pointer 25 can be set to whatever diameter is desired on the scale 24 and that it positively carries, by means of the pin 29, the thread cutting tool 27 back and forth in the ways in the frame 11. The pointer is located in the right position and the thumb nut is tightened up and the thread cutting tool 27 is in the right position for the work of the diameter indicated on the scale.

The cutting tool 27 having been set in the proper position in the manner just described to cut a thread on a tube of predetermined diameter, the tube 10 of that diameter is set on the clutch and the clutch tightened by means of the handle 22 rotating in a left hand direction. As soon as the end of the nut 21 encounters the lead screw 14, the clutch is tightened. Further rotation of the handle 22 draws the lead screw down so that the work makes a revolution for every thread on the lead screw. The tool 27 thus cuts threads 35 on the end of the work 10. This tool cuts threads all at the same pitch, irrespective of the diameter of the work.

Of course, it will be understood that the internal clutch 19, shown, will be set aside and a clutch of another size used for a tube of a different internal diameter.

It will be seen, therefore, that this thread cutting tool, capable of cutting threads on thin tubes of different diameters, is provided with means for setting the cutting tool for these different diameters by the movement of the pointer. This indicates the diameters on the scale 24. The tool is fixed in its adjusted position in a very simple manner. It will be seen that the parts are few and simple and the manipulation is also of the simplest character.

Having thus described our invention and the advantages thereof, we do not wish to be limited to the details herein disclosed, otherwise than as set forth in the claims, and what we claim is:

1. In a device of the character described, the combination with a frame having a rigid handle thereon by which it can be supported, a scale on the frame for indicating the size of the work, a lever pivoted on the frame having a pointer cooperating with the scale, means for clamping the work in adjusted position, means on the frame for supporting the work, and a thread cutting tool movable along a course radial with respect to the work, connected with said lever to be operated thereby toward and from the work for adjustment.

2. In a device of the character described, the combination with a frame, a scale on the frame for indicating the size of the work, a lever pivoted on the rame having a pointer cooperating with the scale, means on the frame for supporting and feeding the work, and a thread cutting tool movable along a course radial with respect to the work, connected with said lever to be operated toward and from the work thereby.

3. In a device of the character described, the combination with a frame and a scale on the frame for indicating the size of the work, of a hand operated lever pivoted on the frame having a pointer cooperating with the scale, means for feeding the work, and a thread cutting tool adjustable directly by the lever toward and from the work and adapted to be fixed in position during operation.

4. In a device of the character described, a frame, a scale on the frame, means to support a cylindrical work-piece on the frame at substantially a right angle to the plane of the scale, a lever pivoted to the frame and having a pointer cooperating with the scale, a cutting tool slidable radially of the work-piece and located in ways in the frame, a surface of said tool being approximately in the plane of the lever and having a stud projecting therefrom, a longitudinal slot in the lever into which the stud extends, whereby the tool is moved longitudinally upon pivoting of the lever.

HENRY L. HANSON.
H. LLOYD HANSON.